United States Patent
Fang et al.

(10) Patent No.: US 12,489,756 B2
(45) Date of Patent: Dec. 2, 2025

(54) RENDER HIGH WORKFLOW EXECUTION RELIABILITY USING IMMUTABLE SECURITY CONTEXT

(71) Applicant: Dell Products L.P., Round Rock, TX (US)

(72) Inventors: Yi Fang, Sharon, MA (US); Georgi Abelovich Yaralov, Travelers Rest, SC (US); Chooi Peng Low, Plano, TX (US); Ching-Yun Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 18/486,713

(22) Filed: Oct. 13, 2023

(65) Prior Publication Data
US 2025/0126125 A1    Apr. 17, 2025

(51) Int. Cl.
H04L 29/06    (2006.01)
H04L 9/40    (2022.01)

(52) U.S. Cl.
CPC .......... *H04L 63/102* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 10,891,569 B1 * | 1/2021 | Werner | G06Q 10/06316 |
| 11,334,471 B1 | 5/2022 | Stocker et al. | |
| 11,818,115 B1 | 11/2023 | Shah et al. | |
| 2008/0216147 A1 | 9/2008 | Duffy | |
| 2011/0209159 A1 * | 8/2011 | Baratz | G06F 16/24575 |
| | | | 707/E17.112 |
| 2014/0123312 A1 | 5/2014 | Marcotte | |
| 2019/0199705 A1 * | 6/2019 | Zhu | H04L 63/083 |
| 2019/0392392 A1 * | 12/2019 | Elden | H04L 9/3239 |
| 2020/0151630 A1 | 5/2020 | Shakhnovich | |
| 2020/0162237 A1 * | 5/2020 | Chauhan | H04L 9/3239 |
| 2020/0351090 A1 * | 11/2020 | Gardner | H04L 9/3247 |
| 2020/0409940 A1 * | 12/2020 | Gu | G06F 11/3006 |
| 2021/0103649 A1 | 4/2021 | Korus et al. | |
| 2022/0070246 A1 | 3/2022 | Ripa | |

(Continued)

OTHER PUBLICATIONS

Rose et al., Zero Trust Architecture, Aug. 1, 2020, NIST Special Publication, 800-207.

*Primary Examiner* — Shin-Hon (Eric) Chen
(74) *Attorney, Agent, or Firm* — Workman Nydegger

(57) ABSTRACT

Up front authorization of a workflow and a security context for workflow execution are disclosed. All possible authorizations that may be required by a workflow definition are identified up front. A requestor is allowed to execute the workflow only when the authorizations of the user include the authorizations that may be required by the workflow. An immutable security context is generated and associated with the workflow or an instance thereof. The immutable security context can prevent or reduce failures associated with changes to a requestor's authorizations and may also scope or limit the workflow to at least the type or capacity of work requested and/or work uniquely identified in the security context. The immutable security context is managed in a security context that is separate and independent of the workflow execution context.

14 Claims, 7 Drawing Sheets

(56) References Cited

U.S. PATENT DOCUMENTS

| | | | |
|---|---|---|---|
| 2022/0292167 A1* | 9/2022 | Vaishnav | G06F 21/51 |
| 2023/0353575 A1* | 11/2023 | Chandra | H04L 63/08 |
| 2025/0094590 A1 | 3/2025 | Jabbar et al. | |
| 2025/0106221 A1 | 3/2025 | Wang et al. | |
| 2025/0124145 A1 | 4/2025 | O'Reilly, Jr. et al. | |

* cited by examiner

```
apiVersion: "v1"
kind: "ConfigMap"
metadata:
  name: "api-key-service-policy"
  labels:
    app: "api-key-service"
data:
  policy.json: |-
    {
      "service" : "api-key-service",
      "resources" : [{
        "path" : "GET /rest/v1/api-access-keys",
        "permission-set" : [{
          "permissions" : "e8db385e-88dc-4828-a5e4-345ccc32f249",
          "displayNames" : "Manage All Access Keys",
          "conditions": "Match_Org"
        }]
      },{
        "path" : "DELETE /rest/v1/api-access-keys/{id}",
        "permission-set" : [{
          "permissions" : "e8db385e-88dc-4828-a5e4-345ccc32f249",
          "displayNames" : "Manage All Access Keys"
        }]
      }]
    }
```

RENDER HIGH WORKFLOW EXECUTION RELIABILITY USING IMMUTABLE SECURITY CONTEXT

RELATED APPLICATIONS

The present application is related to application Ser. No. 18/486,317, entitled PROTECTING WORKFLOW SECURITY BY UP-FRONT AUTHORIZATION AND CAPACITY-SCOPED CRYPTOGRAPHIC SECURITY CONTEXT and filed the same day as the present application. The present application also relates to application Ser. No. 18/466,907, filed Sep. 14, 2023, and entitled METHODS TO ENSURE TRUST VALIDATION AND INTEGRITY OF WORKFLOW EXECUTION. The foregoing applications are incorporated by reference in their entirety.

FIELD OF THE INVENTION

Embodiments of the present invention generally relate to workflows and workflow security. More particularly, at least some embodiments of the invention relate to systems, hardware, software, computer-readable media, and methods for workflow security using up front authorization and a security context that is bound to the workflow.

BACKGROUND

From a practical perspective, a workflow, once initiated, should run to completion without interruption. However, interruptions such as workflow failure may occur. A workflow may fail for various reasons, such as lack of authorizations (also referred to herein as permissions). Recovering from workflow failure, particularly if manual recovery is required, is costly and difficult.

Workflow subsystems are a key building block of multicloud management services. Workflow definitions divide long management procedures into smaller tasks or activities. The workflows are then orchestrated, which may be event based orchestration. When performing these smaller tasks and activities, recovery logic may be executed to recover from failure events. For example, it may be possible to recover from events such as resource contention or capacity shortage. The workflow executions, in these examples, may be temporarily blocked. The workflow execution resumes when the failure events are resolved.

Part of authorizing a workflow relates to answering the question of whether a requestor (e.g., user, client, application) is permitted to perform an action on a specified resource. This is often referred to as a subject-action-resource check.

Subject-action-resource checks are an important aspect of workflow security, but there are still risks. Unexpected changes in a requestor's credentials and/or a change in access control policies may impact the orchestration and/or execution of a workflow or of managing the workflow. While changes in credentials or access policies are often necessary, these changes may prevent workflow execution from moving forward or rolling back. More specifically, these changes may result in insufficient authorizations and prevent the workflow from moving forward or rolling back. Mitigating these types of failures is difficult and may have to be resolved manually. This increases the cost of the workflow execution at least in terms of time and computing resources.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2C discloses aspects of aggregating authorizations from workflow code or other sources associated with executing a workflow;

DETAILED DESCRIPTION OF SOME EXAMPLE EMBODIMENTS

Figure 1:
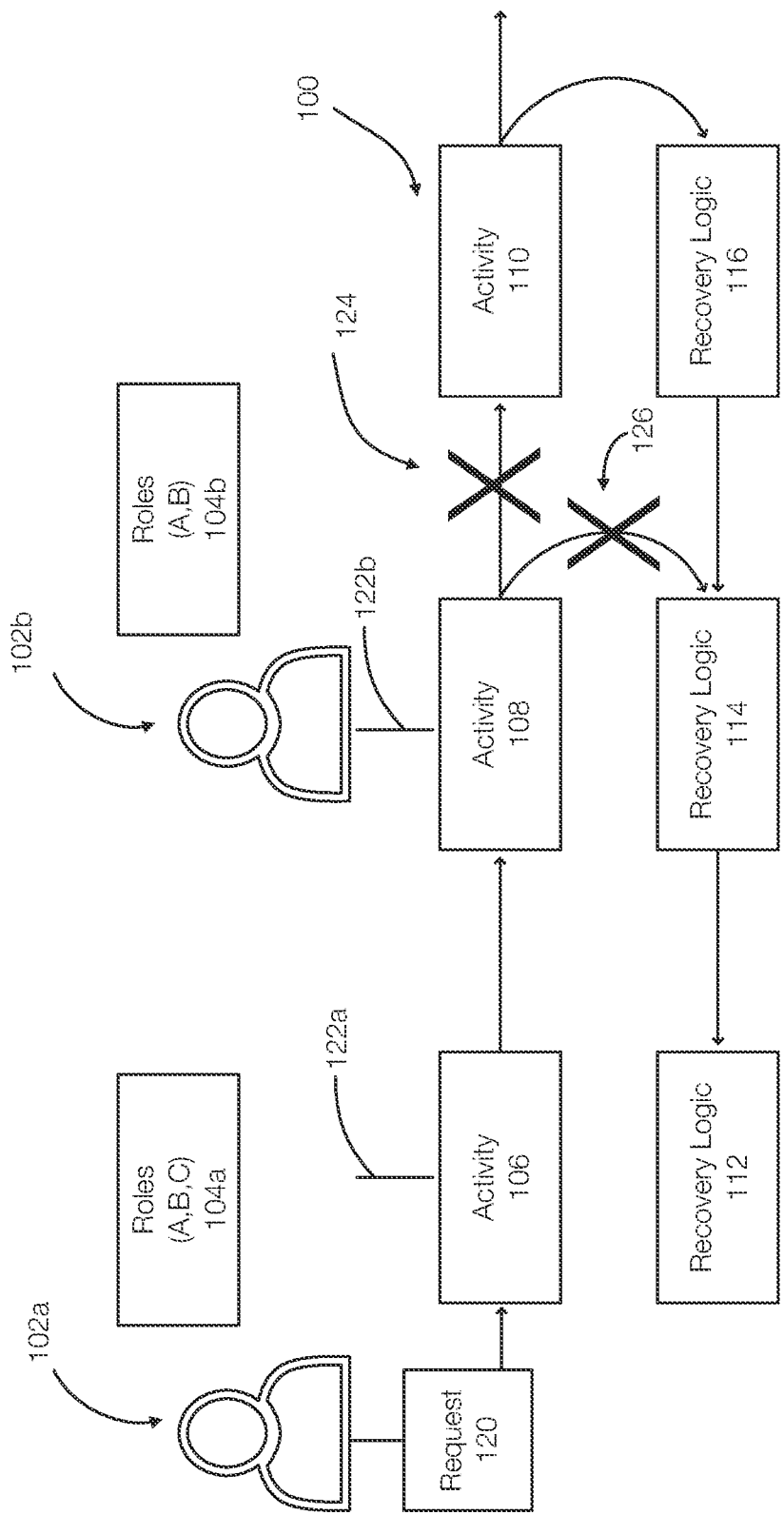
FIG. 1 discloses aspects of how authorizations that change during a workflow execution may impact the workflow execution.

Embodiments of the present invention generally relate to workflow execution and workflow authorization. More particularly, at least some embodiments of the invention relate to systems, hardware, software, computer-readable media, and methods for ensuring that a requestor is authorized to perform a workflow prior to executing the workflow. Embodiment of the invention further relate to trustable and durable security contexts. A security context, by way of example, may relate to scoping a workflow to specific actions even when, by way of example, a requestor may be authorized to perform other actions. More generally, scoping a workflow with a security context may include placing limits of various kinds on the workflow. Embodiments of the invention further relate to ensuring the reliability of workflow execution using an immutable security context.

The time required to execute a workflow may be long and indeterminate. This presents an issue because the application programming interface (API) of each service used by the workflow often verifies and determines whether to proceed with a request (work or a job) and because a user's credentials or authorizations may have a limited lifetime. Embodiments of the invention relate to ensuring that the authorizations (e.g., credentials, permissions, roles, policies) of a requestor remain valid and trustworthy throughout the execution of a workflow.

Embodiments of the invention relate to authorizing a requestor up front or prior to initiating the workflow and to providing a security context (e.g., in a form of a token) that may scope or limit actions performed in the context of the workflow regardless of the requestor's authorizations. The security context, for example, may prevent an action from being performed in the context of a workflow or action that the requestor is otherwise authorized to perform.

A workflow definition may include a hierarchy that includes child workflow definitions, each with unique authorization requirements. Consequently, the actual workflow execution path may depend on various events, some of which may be unpredictable. When authorizing a workflow, embodiments of the invention may consider all workflow execution scenarios in order to reliably ensure that the requestor is authorized to execute the workflow.

Executing a workflow may involve remote devices/applications (services) that may depend on an external third-party identity provider and/or authorization service. Embodiments of the invention relate to ensuring the requestor is authorized to perform the workflow and that the workflow or requestor is associated with an immutable security context. Embodiments of the invention ensure that the immutable security context scopes the workflow, has an appropriate lifetime, and is protected against unauthorized use.

The execution of a workflow may include operational aspects and security aspects. A workflow engine, such as Camunda or Temporal, may handle workflow state management or other operational aspects. This may include managing running workflows, managing inactive workflows, and dispatching tasks/activities.

A workflow context typically contains data, such as authorizations, that may be needed by the workflow execution. The security context data include sensitive personal identity data, credentials, and the like. Embodiments of the invention relate to managing a workflow context and a security context to provide a secure and trustworthy execution environment.

Generally, embodiments of the invention may perform an initial or upfront evaluation to determine whether a requestor has the authorizations (e.g., roles and permissions) required by a workflow definition. This may be determined prior to instantiating the workflow. If the requestor has the required authorizations for the workflow, embodiments ensures that the workflow execution is reliable and unaffected by changes (e.g., credential changes, role changes access control policy changes) in the authorizations of the requestor.

If the authorizations of a requestor changes, embodiments of the invention further ensure that whether the associated workflow continues is a policy decision on the side of the requestor. If the workflow should be stopped due to the changes in the authorizations, the policy on the requestor side may stop the workflow execution. In one example embodiment, changes to the authorizations of the requestor will not prevent the workflow from executing. Rather, embodiments of the invention allow the decision of allowing the workflow to continue to be driven by policy. In this example, the requestor's side conveys that if the original requestor's authorizations have changed, a requestor (or user) with the required authorizations other than the original requestor will need to invoke a cancel operation. An immutable security context ensures that the workflow can continue in the event that the requestor loses a particular authorization needed to perform the workflow.

Prior to discussing aspects the of an immutable security context, aspects of ensuring that a workflow is authorized or that the requestor is authorized are discussed.

FIG. 1 discloses aspects of how changes to a requestor's authorizations may impact a workflow execution. In FIG. 1, the requestors 102a and 102b represent the same requestor at different points in time 122a and 122b. Similarly, the roles 104a and 104b represent the roles of the same requestor at the points in time 122a and 122b.

FIG. 1 illustrates an example workflow 100 that includes activities 106, 108, and 110, which may be associated, respectively, with recovery logics 112, 114, and 116. The workflow 100 may be a portion of a larger workflow. FIG. 1 illustrates a workflow that is initiated by the requestor 102a. A request 120 is generated by the requestor 102a that, at the time 122a of the request 120, is associated with roles 104a (or authorizations) that include A, B, and C.

At the time 122a, execution of the workflow 100 begins in response to the request 120 by performing the activity 106. The workflow then proceeds to the activity 108. At the time 122b, which corresponds to completion of the activity 108, an evaluation of the requestor's roles indicates that the roles 104a have changed to be the roles 104b, which now include roles A and B. Thus, the requestor 102b (the requestor 102a at time 122b) is no longer associated with the role C.

Consequently, an event failure 124 occurs because the role C is required for the activity 110. The workflow 100 cannot move forward from the activity 108 (e.g., or state) to the activity 110 (or state) because the requestor 102b no longer has the required roles or authorizations to perform the activity 110. Similarly, the workflow cannot recover 126 using the recovery logic 114 to roll back to the activity 106 (or state) because the requestor 102b no longer has the required roles or authorizations to perform the recovery logic 114, which also requires the role C.

The authorizations of a requestor may change for various reasons. For example, a requestor may be assigned a reduced role or move to a new project or to a different company. The roles and authorizations may be adjusted for other reasons. FIG. 1 illustrates that changes to the authorizations of a requestor may adversely impact the execution of a workflow.

Embodiments of the invention ensure that a workflow can continue when the authorizations of a requestor change. Embodiments of the invention further allow the execution of the workflow to be cancelled at the requestor's side when the authorizations of the requestor change. This may prevent a failure event and prevent or reduce the problems of recovering from failures related to changes in requestor authorizations.

Initially, embodiments of the invention ensure that a requestor has the authorizations required to perform all aspects of a workflow regardless of the paths taken during execution of the workflow.

Figure 2A:
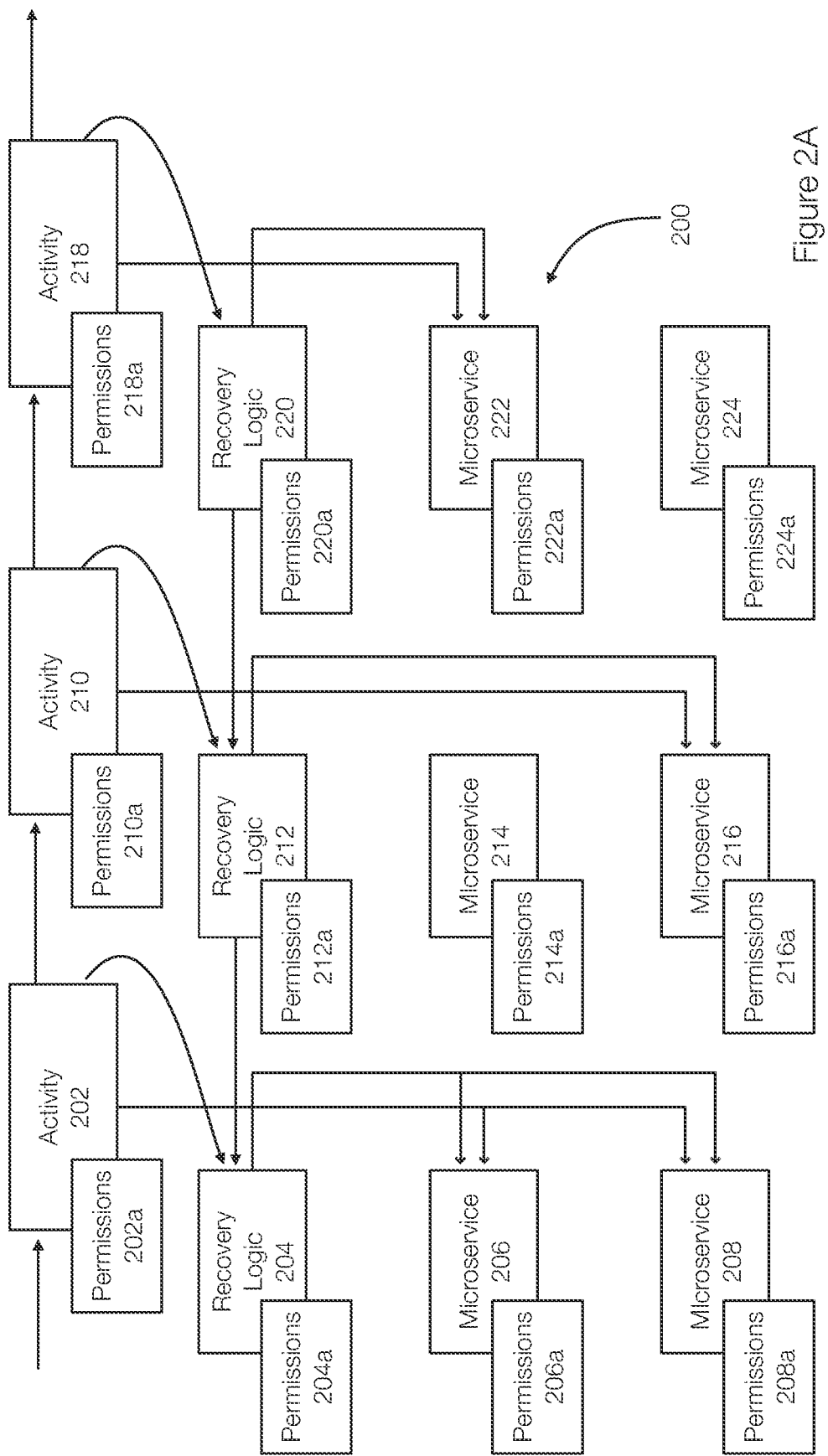
FIG. 2A discloses aspects of evaluating authorizations in the context of an example workflow.

FIG. 2A discloses aspects of a workflow that may be executing or that is planned for execution in a computing environment that may include processors, memory, networks, or the like. The workflow 200 may be executed in a multi-cloud environment. The workflow 200 may be performed or executed in one or more different networks or platforms (e.g., an edge network and/or a cloud network). The example workflow 200 (which may represent a portion of a workflow) includes activities 202, 210, and 218. The activities 202, 210, and 218 may represent functions, calls, applications, processes, operations, or the like, of the workflow 200. The activities 202, 210, and 218 may be or include calls to the APIs of one or more services, such as microservices or other applications or processes.

For example, the activity 202 may include executing a service at a first platform or using the services provided by a first platform. The activities 210 and 218 may include executing or calling services at the same or other platforms.

FIG. 2A illustrates that the activity 202 may be associated with recovery logic 204 and may use or invoke microservices (services) 206 and 208 using their APIs. The activity 210 may be associated with recovery logic 212 and may invoke the microservice 216 (microservice 214 is not required by the workflow 200). The activity 218 may be associated with recovery logic 220 and may invoke the microservice 222 (the microservice 224 is not invoked by the workflow 200).

In this example and as illustrated in FIG. 2A, each of the activities, microservices, and recovery logics may be associated with specific authorizations or permissions, represented as permissions 202a, 204a, 206a, 208a, 210a, 212a, 214a, 216a, 218a, 220a, 222a, and 224a.

FIG. 2A further illustrates that the total or maximum authorization requirements (e.g., permissions) required for the workflow are the aggregate of the authorization requirements of all microservices or other services that may be accessed in the course of executing or performing the workflow. For example, the permissions 202a is a combination or union of the permissions 206a and 208a. Thus, if the permissions 206a include permissions a, b, and c and the permissions 208a include permissions d, e, and f, then the permissions 202a for the activity 202 include or may require permissions a, b, c, d, e, and f.

Similarly, if the permissions 214a include permissions g and h and the permissions 216a include the permissions I, j, and k, then the permissions 210a include the permissions l, j, and k. The permissions 214a are not included in the permissions 210a at least because the microservice 214 is not accessed by the workflow 200. Similarly, the permissions 224a (permissions o, p, and q) are not included in the permissions 218a (permissions l, m, and n), which are the same as the permissions 222a. The authorizations or permissions for the workflow 200 include the aggregate or union of the permissions 202a, 210a, and 218a in this example.

As previously discussed, the exact execution path of a workflow execution is indeterministic. In contrast, the aggregate permissions required by all possible paths a workflow execution may take is deterministic. The authorization requirements of a top-level workflow definition is therefore deterministic and is an aggregate of all authorization requirements of all workflow definitions in the hierarchy of workflows, which may include a top level workflow definition and one or more child workflow definitions.

FIG. 2A illustrates an example where all possible authorizations are determined up front or prior to the execution of the workflow in one example. This allows a work scheduler or job scheduler, which may be configured to evaluate the requestor's authorizations in light of the authorizations that may be required by the workflow execution, to determine whether a requestor has the authorizations needed to execute the workflow even if the actual execution path of the workflow is indeterministic.

Embodiments of the invention relate to evaluating a workflow, its definitions, its code, API code, or the like in order to identify all of the authorizations that may be required. The requestor's authorizations may be evaluated in light of the aggregate authorizations to determine whether the requestor will be able to perform the workflow and avoid failure due to authorization problems.

Figure 2B:
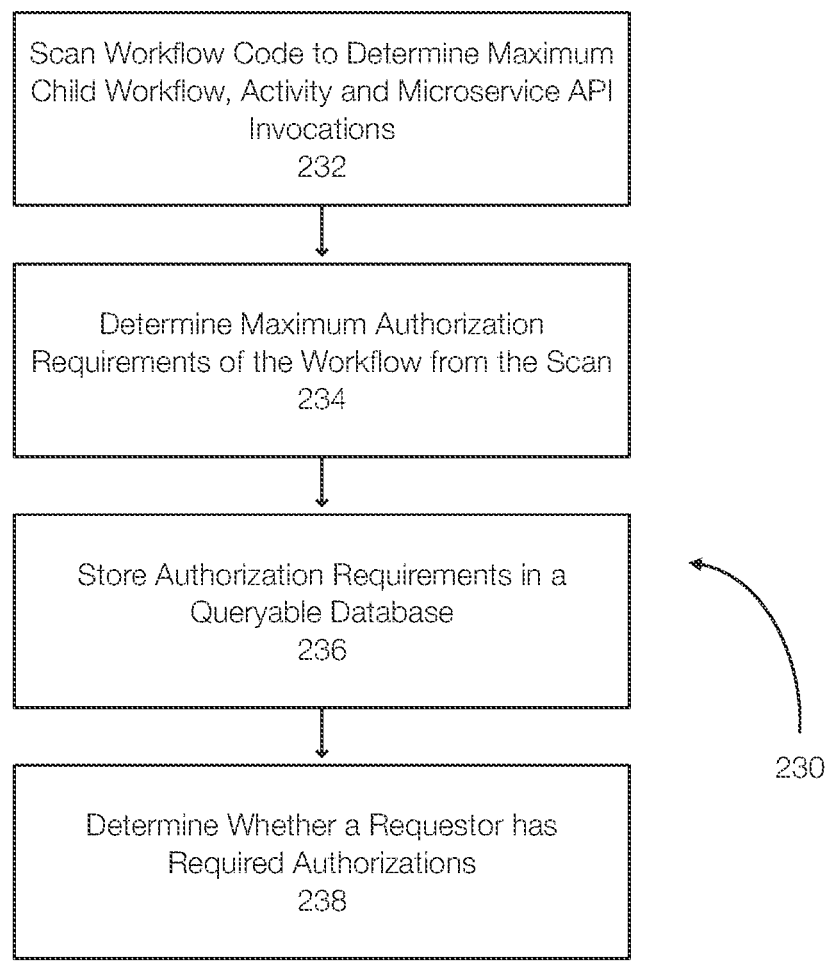
FIG. 2B discloses aspects of determining aggregate permissions associated with a workflow.

FIG. 2B discloses aspects of determining aggregate authorizations associated with a workflow. In the method 230, workflow code (or hierarchy, definitions) or code related to the workflow is scanned 232 to determine or identify the maximum child workflow invocations, activity invocations, and microservice API invocations. This allows the maximal authorization requirements of the workflow to be determined 234 from the scan of the workflow code.

The authorization requirements identified from the scan of the workflow definition are stored 236 in a database. The database can be queried to determine 238 whether a requestor has the required authorizations for a requested workflow. For example, a requestor may make a request to execute a workflow. The requestor may be associated with a set of authorizations and the set of authorizations that may be required by a workflow are stored in a database or can be determined by evaluating the workflow. The database is queried to determine whether the requestor has the authorizations needed to perform the workflow by comparing the authorizations of the requestor to the authorizations that may be needed to execute the workflow. In one example, the workflow is authorized only when the requestor has all of the authorizations associated with the workflow. This may allow remedial operations (e.g., granting new authorizations) to be performed prior to executing the workflow to prevent workflow failure due to lack of authorizations. Thus, embodiments of the invention can determine, prior to executing a workflow or when granting authorization to a requestor, whether the authorizations (e.g., roles and/or permissions) of the requestor are sufficient to execute the workload.

FIG. 2C discloses aspects of aggregating authorizations from workflow code or other sources associated with executing a workflow. More specifically, the access control requirements of service APIs may be declared in their access control policies. This allows the source code to be scanned to determine the authorizations required by every service API, by every workflow activity, by every workflow definition, and by every top-level workflow definition. Scanning the source code and storing the access requirements or permissions in a database allows the ability of a requestor to perform a workload to be determined in advance of executing the workload.

FIG. 2C illustrates an example of an access control policy 250. The policy 250 may be scanned to identify the authorizations (e.g., the permissions or permission set) that a requestor needs to use the service. Scanning the access control policies of all APIs identified in the workflow definitions allows the aggregate authorizations or permissions to be identified.

In addition to determining authorization requirements, embodiments of the invention also provide or generate a security context that may be provided to each service API. The security context allows each service to determine, on its own, whether to proceed with a request. The security context may include security credentials, which may have a limited lifetime. When executing a workflow, the security context may scope the actions allowed in the workflow, even when issued by a third party identity provider.

In one example, embodiments of the invention associate the ability to determine the ability of a requestor to perform a workload in advance with a capacity-scoped security context, referred to herein as a security context. Generally, access to resources is achieved using data that is verifiable (e.g., cryptographically verifiable) and that represents access authorization. A JWT (JSON (Javascript Object Notation) Web Token) access token is an example of an access token that may be used in token-based authentication. The access token may allow, for example, an application to access the API of a service. The access token informs the target service that the bearer of the token (i.e., the application) is authorized to access the API of the service and perform actions using the service.

Generally, access tokens have a validity period and the access token becomes invalid when the validity period expires. Because it is impractical for a user to constantly interact with a token issuer (e.g., an authorization server), a separate credential artifact or a refresh token is used to refresh the access token without user interaction. This also allows the authorization server to shorten the lifetime of the access token for security purposes.

However, access tokens are still associated with some risk. For example, there is a security risk if the access token is kept alive longer than needed. This may allow the access token to be stolen and used maliciously. Another problem occurs if the access token needed to access the API of a service lapses while the application is still working on a request. In addition, a problem may arise if access to the access token is not controlled. Thus, only legitimate services working on behalf of the user's request should be allowed access to the access token.

The security provided by access tokens can be improved by embodiments of the invention. More specifically, embodiments of the invention relate to a security context. In one example, a security context is a token includes or represents a combination of an access token and a capacity-scoped security context. However, the security context may be a separate token from the access token.

The security context scopes the ability to perform actions within the workflow. For example, the security context may prevent a requestor from accessing a particular service or a particular method of the service (or the service itself) or from performing certain actions on specified resources even though the requestor may otherwise be authorized to access that particular method or perform those actions. In other words, just because a requestor is authorized to access a specific service or perform a certain action on a particular resource is distinct from whether the requestor is allowed to perform the same action within the context of the work that has been requested. The security context scopes activities in the workflow to ensure that the activities performed or authorized in the context of the workflow.

More specifically, the security context may scope a request and allows each service API to decide whether to proceed with the request. The security context may be cryptographically verifiable and include information for a typical subject-action-resource permission decisions. In addition, and by way of example only, the security context may scope the type or capacity of work requested, is valid only to the work uniquely identified (e.g., the work ID), and may identify the service/workflow/call paths that the request or workflow is allowed to follow. In one example, a security context may include a requestor identity attribute, an organization attribute, a granted roles attribute, and the like.

Figure 3:
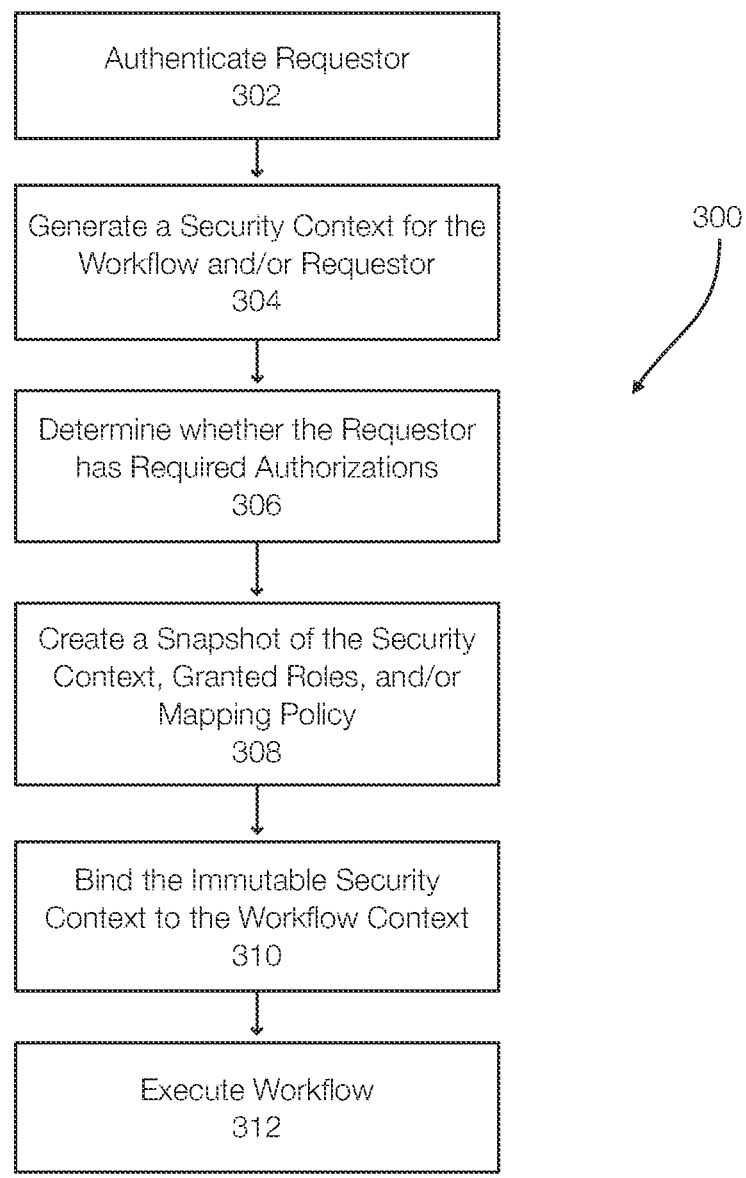
FIG. 3 discloses aspects of a method for performing upfront authorization and providing an immutable security context.

FIG. 3 discloses aspects of a method for performing upfront authorization and providing an immutable security context. The method 300 includes authenticating 302 a requestor. In one example, the requestor may be a user, an application, a device (server) or the like. The authentication may include validating the requestor's credentials. At least some elements of the method 30 (e.g., elements 304 and 306) may be performed in different orders.

If the requestor is authenticated, a security service may generate 304 a security context. The security context may include various attributes such as an identity attribute, an organization attribute, a granted roles attribute, or the like.

Next, an authorization service may determine 306 whether the requestor has the authorizations (e.g., roles, organization, identity) required to perform the workflow being requested. More specifically in one example, the security context may refer to the requestor's data that are self-contained for authorization decisions. The security context may include the requestor's identity, the requestors attributes, the roles that have been granted to the requestor, and pertinent or relevant access control policy including the permissions mapped to the granted roles. This may include comparing the authorizations of the requestor with a database that stores the authorizations required by the workflow.

If the requestor is authorized, the security service may create 308 a snapshot of the security context. The security context (or the snapshot) may also be configured to include the granted roles and permission mapping policy. The integrity of the security context or snapshot is protected, in one example, with a digital signature. The security context or snapshot is immutable in the sense that the security context or snapshot is read-only throughout the workflow execution.

In one example, creating an immutable security context insures that the authorizations present at the beginning of the workflow are present and immutable for the duration of the workflow execution. This is relevant because at least because (i) a subsequent authorization decision in a workflow execution is consistent with the upfront authorization decision and (ii) the code of a workflow cannot tamper with the requestor's security context. Using a digital signature to render the security context immutable protects the integrity and authenticity of the security context.

A workflow service may then bind 310 the immutable security context (or snapshot) to the workflow context. The workflow may then be instantiated and executed 312. In one example, the immutable security context is evaluated for authorizations as necessary during execution of the workflow rather than evaluating the current authorizations of the requestor, which may have changed. This may prevent execution failures due to insufficient authorizations. Further, the decision to cancel a workflow now resides on the requester-side. The decision to cancel does not necessarily reside with the original requestor, but may be made by other requestors with sufficient authorizations. Thus, cancelling a workflow becomes a policy decision rather than a failure that requires recovery operations.

Workflows can switch between active and inactive states and a workflow context is visible in an administrative user interface. Embodiments of the invention handle the security context management and make the security context available to the workflow execution code.

Figure 4:
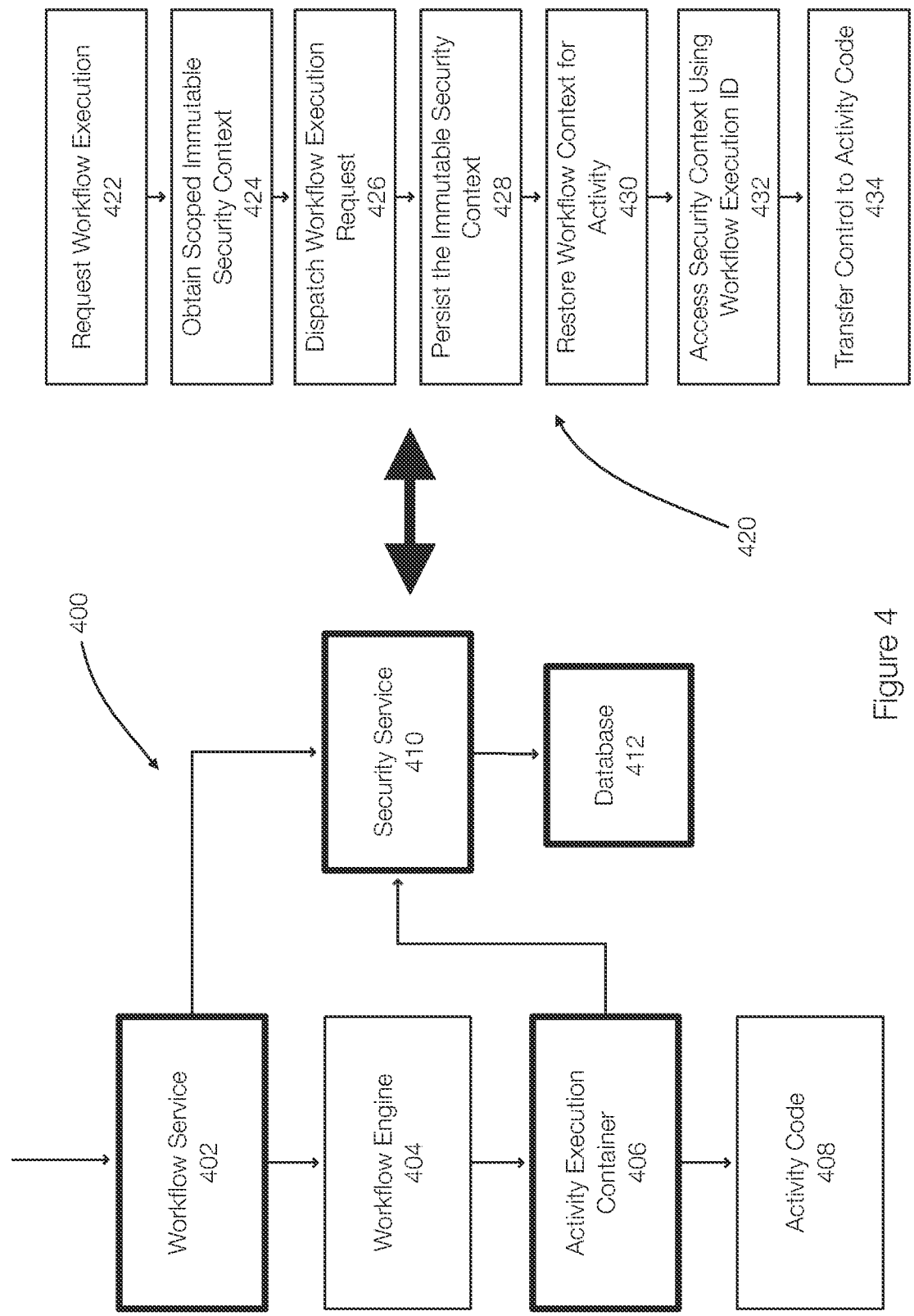
FIG. 4 discloses aspects of workflow execution security context management in an example environment and aspects of an example method for managing a security context of workflow execution.

FIG. 4 discloses aspects of workflow execution security context management in an example environment and aspects of an example method for managing a security context of workflow execution. In the method 420, a request for a workflow execution may be received 422 at a workflow service 402. When the request is received at the workflow service 402, the workflow service 402 may obtain 424 a scoped immutable security context from a security service 410. The workflow service 402 may also perform other tasks such as authentication and upfront authorization to ensure that the requestor has sufficient authorizations to perform the workflow.

In one example, the security context is generated or issued only when the user is authenticated and authorized. The security context may also be digitally signed in order to ensure that the security context is read only and immutable. This allows the security service 410 to validate the security context used during workflow execution and prevent changes to the security context.

As previously described, the security context may include a requestor's identity, attributes, granted roles, and pertinent access control policy that includes permissions mapped to the granted roles. The security context is made immutable and may be bound to the workflow context. As previously described, the security context is immutable in the sense that the security context is read-only during execution of the workflow to ensure that the authorizations required during workflow execution are available. This may be achieved by generating a snapshot or other read-only copy of the security context and/or by digitally signing the security context. Thus, the immutable security context is digitally signed in one example.

Once the immutable security context is obtained 424, the workflow execution request is dispatched 426 to a workflow engine 404 such as, by way of example only, Camunda and Temporal. The immutable security context is also persisted 428 in a database 412 by the security service 410.

As the workflow context is managed by the workflow engine 404, the workflow execution may become active. For example, a blocked activity may be unblocked for execution and the workflow context is restored 430 for the activity. In this example, control is transferred to an activity execution container 406 such that the security context can be made available to the activity runtime environment. The activity execution container 406 is responsible for validating integrity of the workflow definition and the integrity of the activity code.

In one example, the activity execution container 406 may access the immutable security context stored in the database 412 using the workflow execution ID to ensure that the activity is permitted (e.g., the requestor is authorized). Because the immutable security context has not changed and because the authorizations were confirmed upfront, the activity will not fail due to changes that may have occurred to the requestor's authorizations.

Once the immutable security context is used to ensure that the activity is authorized, control of the workflow may be transferred 434 to the activity code 408. Aspects of the method 420 may be repeated as the workflow state changes (e.g., active-inactive or inactive-active).

FIG. 4 further illustrates an example of a trusted computing base (TCB) for workflow execution that cleanly separates the security infrastructure from workflow code including third party workflow code. In this example, the workflow service 402, the security service 410, the database 412, and the activity execution container 406 may be related to the security infrastructure and are separated from and independent of the workflow engine 404, which may be provided by a third party, and from the activity code 408, which may be business logic.

Embodiments of the invention advantageously persist a snapshot of a snapshot of a requested security context, which includes requester data, granted roles, and mapped permissions. This allows a security service to construct an immutable security context. Embodiments of the invention further combine upfront top-level workflow authorization decisions with an immutable security context. This immutable security context can be used in subsequent workflow execution authorization decisions and resolves problems associated with workflow reliability that are caused by changes to a requestor's authorizations.

An immutable security context is used to ensure that the security context of the workflow is isolated from the execution context and allows the workflow to be executed on arbitrary nodes in an appropriate execution and security context.

More specifically, embodiments of the invention build and use an immutable security context using a trusted computing base. This ensures that there is a clean separation between the security infrastructure and third party workflow engines. More specifically, embodiments of the invention separate security context data from workflow context data. Embodiments of the invention provide a trusted computing base that has sole control of privacy and security management. In one example, the security context is not part of workflow context and sensitive security context data is never persisted with workflow execution state and workflow context data. The trusted computing base manages the lifecycle of the immutable security context and is configured to initialize the security context prior to transferring execution to workflow activities.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, workflow operations, token related operations, scoping operations, security context operations, authorization operations, or the like. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any operation(s) of any of the methods discloses herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving a request for a workflow execution from a requestor at a workflow service, obtaining an immutable security context from a security service, wherein the immutable security context is read-only during the workflow execution, persisting the immutable security context in a database accessible by the security service, dispatching the request for the workflow execution to a workflow engine, when restoring a workflow context for an activity, accessing the immutable security context to validate that the activity is authorized, and transferring control to activity code of the activity, where a security context associated with the immutable security context is isolated and separated from the workflow context managed by the workflow engine.

Embodiment 2. The method of embodiment 1, further comprising performing authenticating the requestor.

Embodiment 3. The method of embodiment 1 and/or 2, further comprising performing an upfront authorization to ensure that the requestor has all authorizations that may be required during the workflow execution.

Embodiment 4. The method of embodiment 1, 2, and/or 3, wherein the upfront authorization is performed by comparing the authorizations of the requestor with authorizations associated with a workflow definition, wherein the workflow definition includes a top level workflow definition and one or more child workflow definitions.

Embodiment 5. The method of embodiment 1, 2, 3, and/or 4, wherein the immutable security context includes one or more of an identity of the requestor, attributes of the requestor, roles granted to the requestor, and/or pertinent access control policy including permissions mapped to the roles granted to the requestor.

Embodiment 6. The method of embodiment 1, 2, 3, 4, and/or 5, further comprising generating a snapshot of a security context generated for the requestor to generate the immutable security context.

Embodiment 7. The method of embodiment 1, 2, 3, 4, 5, and/or 6, further comprising digitally signing the immutable security context.

Embodiment 8. The method of embodiment 1, 2, 3, 4, 5, 6, and/or 7, accessing the database using a workflow execution identifier by an activity execution container to make the security context available to a runtime environment of an activity associated with the workflow execution.

Embodiment 9. The method of embodiment 1, 2, 3, 4, 5, 6, 7, and/or 8, further comprising binding the immutable security context to the workflow context, further comprising cancelling the workflow in response to changes in authorizations of the requestor.

Embodiment 10. The method of embodiment 1, 2, 3, 4, 5, 6, 7, 8, and/or 9, further comprising executing the workflow using the immutable security context, wherein the immutable security context prevents failures due to changes in the authorizations of the requestor that occurred after commencement of the workflow execution and/or due to insufficient authorizations.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, client, service, agent, or the like, may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
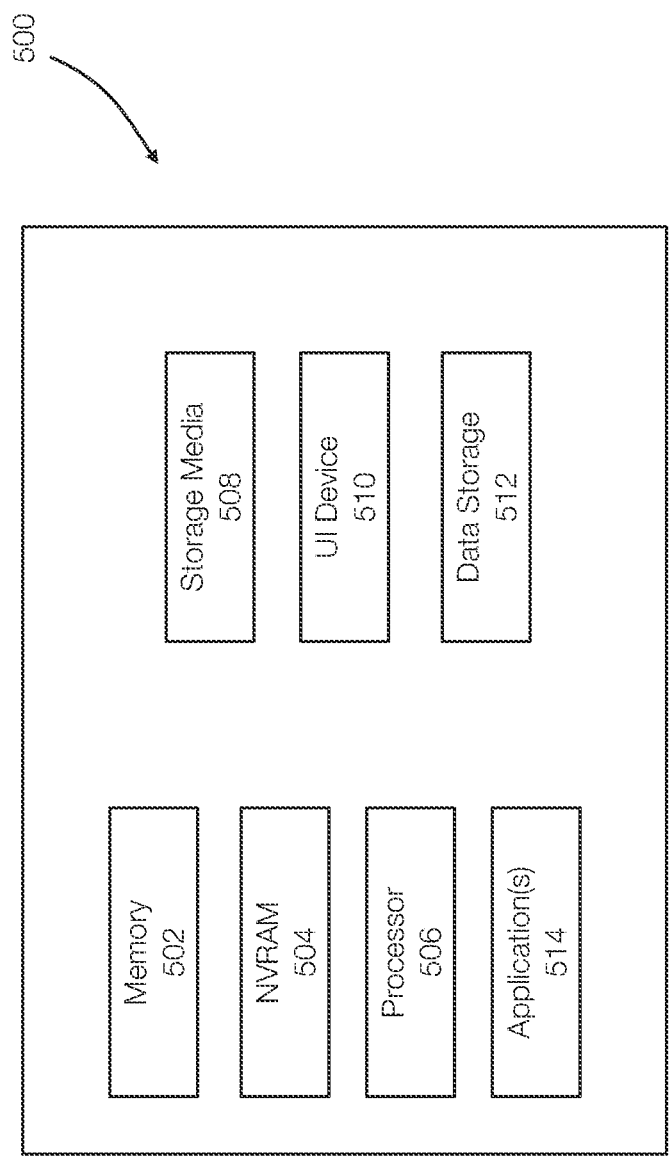
FIG. 5 discloses aspects of a computing device, system, or entity.

With reference briefly now to FIG. 5, any one or more of the entities disclosed, or implied, by the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving a request for a workflow execution from a requestor at a workflow service;
generating a snapshot of a security context generated for the requestor to generate an immutable security context by a security service;
obtaining the immutable security context from the security service, wherein the immutable security context is read-only during the workflow execution;
persisting the immutable security context in a database accessible by the security service;
accessing the database using a workflow execution identifier by an activity execution container to make the security context available to a runtime environment of an activity associated with the workflow execution;
binding the immutable security context to the workflow context, wherein the workflow is cancelled in response to changes in authorizations of the requestor;
dispatching the request for the workflow execution to a workflow engine;
when restoring a workflow context for an activity, accessing the immutable security context to validate that the activity is authorized; and
transferring control to activity code of the activity, where a security context associated with the immutable security context is isolated and separated from the workflow context managed by the workflow engine.

2. The method of claim 1, further comprising performing authenticating the requestor.

3. The method of claim 1, further comprising performing an upfront authorization to ensure that the requestor has all authorizations that may be required during the workflow execution.

4. The method of claim 3, wherein the upfront authorization is performed by comparing the authorizations of the requestor with authorizations associated with a workflow definition, wherein the workflow definition includes a top level workflow definition and one or more child workflow definitions.

5. The method of claim 1, wherein the immutable security context includes one or more of an identity of the requestor, attributes of the requestor, roles granted to the requestor, and/or pertinent access control policy including permissions mapped to the roles granted to the requestor.

6. The method of claim 1, further comprising digitally signing the immutable security context.

7. The method of claim 1, further comprising executing the workflow using the immutable security context, wherein the immutable security context prevents failures due to changes in the authorizations of the requestor that occurred after commencement of the workflow execution and/or due to insufficient authorizations.

8. A non-transitory storage medium having stored therein instructions that are executable by one or more hardware processors to perform operations comprising:
receiving a request for a workflow execution from a requestor at a workflow service;
generating a snapshot of a security context generated for the requestor to generate an immutable security context by a security service;
obtaining the immutable security context from the security service, wherein the immutable security context is read-only during the workflow execution;
persisting the immutable security context in a database accessible by the security service;
accessing the database using a workflow execution identifier by an activity execution container to make the security context available to a runtime environment of an activity associated with the workflow execution;
binding the immutable security context to the workflow context, wherein the workflow is cancelled in response to changes in authorizations of the requestor;
dispatching the request for the workflow execution to a workflow engine;
when restoring a workflow context for an activity, accessing the immutable security context to validate that the activity is authorized; and
transferring control to activity code of the activity, where a security context associated with the immutable security context is isolated and separated from the workflow context managed by the workflow engine.

9. The non-transitory storage medium of claim 8, further comprising performing authenticating the requestor.

10. The non-transitory storage medium of claim 8, further comprising performing an upfront authorization to ensure that the requestor has all authorizations that may be required during the workflow execution.

11. The non-transitory storage medium of claim 10, wherein the upfront authorization is performed by comparing the authorizations of the requestor with authorizations associated with a workflow definition, wherein the workflow definition includes a top level workflow definition and one or more child workflow definitions.

12. The non-transitory storage medium of claim 8, wherein the immutable security context includes one or more of an identity of the requestor, attributes of the requestor, roles granted to the requestor, and/or pertinent access control policy including permissions mapped to the roles granted to the requestor.

13. The non-transitory storage medium of claim 8, further comprising digitally signing the immutable security context.

14. The non-transitory storage medium of claim 8, further comprising executing the workflow using the immutable security context, wherein the immutable security context prevents failures due to changes in the authorizations of the requestor that occurred after commencement of the workflow execution and/or due to insufficient authorizations.

* * * * *